ized Patent No.: US 8,640,642 B2
(12) United States Patent
Bourne
(45) Date of Patent: Feb. 4, 2014

(54) APPARATUS AND METHOD FOR INTERNALLY LINING AN ELONGATE MEMBER

(76) Inventor: Reginald Charles Bourne, Winthrop (AU)

( * ) Notice: Subject to any disclaimer, the term of this patent is extended or adjusted under 35 U.S.C. 154(b) by 267 days.

(21) Appl. No.: 12/811,293

(22) PCT Filed: Feb. 5, 2009

(86) PCT No.: PCT/AU2009/000141
§ 371 (c)(1),
(2), (4) Date: Jun. 30, 2010

(87) PCT Pub. No.: WO2009/097659
PCT Pub. Date: Aug. 13, 2009

(65) Prior Publication Data
US 2010/0285216 A1    Nov. 11, 2010

(30) Foreign Application Priority Data
Feb. 6, 2008  (AU) ................................ 2008200548

(51) Int. Cl.
*B05C 7/04* (2006.01)
*B05C 7/00* (2006.01)
*B05C 5/02* (2006.01)
*B05C 5/00* (2006.01)

(52) U.S. Cl.
USPC ................... 118/317; 118/300; 118/DIG. 10

(58) Field of Classification Search
None
See application file for complete search history.

(56) References Cited

U.S. PATENT DOCUMENTS

| 3,233,580 | A | * | 2/1966 | Levake | 118/317 |
| 3,245,824 | A | * | 4/1966 | Treat et al. | 427/181 |
| 3,643,727 | A | * | 2/1972 | Longoni et al. | 164/465 |
| 3,858,552 | A | * | 1/1975 | Takata et al. | 118/318 |
| 4,321,227 | A | * | 3/1982 | Henfrey et al. | 264/167 |
| 4,414,918 | A | * | 11/1983 | Holland et al. | 118/306 |
| 4,474,134 | A | * | 10/1984 | Snow | 118/57 |
| 4,687,677 | A | * | 8/1987 | Jonasson | 427/8 |
| 4,704,986 | A | * | 11/1987 | Remp et al. | 118/318 |
| 5,230,842 | A | * | 7/1993 | Munde | 264/34 |
| 5,413,638 | A | * | 5/1995 | Bernstein et al. | 118/620 |
| 5,460,850 | A | * | 10/1995 | Schuppe et al. | 427/183 |
| 5,891,248 | A | * | 4/1999 | Koshiba et al. | 118/306 |
| 5,939,145 | A | * | 8/1999 | Oram | 427/407.1 |
| 6,220,305 | B1 | * | 4/2001 | Johnson et al. | 138/146 |

(Continued)

FOREIGN PATENT DOCUMENTS

GB    2 388 639    11/2003
JP    11-147063    6/1999

OTHER PUBLICATIONS

JP 11-147063. Hiroyuki et al., Method and Apparatus for Lining Inside of Pipe, Feb. 6, 1999. (English machine translation of submitted prior art.).*
International Search Report mailed Mar. 13, 2009.

*Primary Examiner* — Dah-Wei Yuan
*Assistant Examiner* — Jethro Pence
(74) *Attorney, Agent, or Firm* — Nixon & Vanderhye P.C.

(57) ABSTRACT

An apparatus for internally lining an elongate member, the apparatus including an outer barrel portion and an inner mold head, an annular mold cavity defined between the outer barrel portion and the inner mold body, and means for providing a settable material to the mold cavity wherein the settable material is injected into the mold cavity as the elongate member is forced past the cavity, internally lining the elongate member.

18 Claims, 4 Drawing Sheets

(56) References Cited

U.S. PATENT DOCUMENTS

| | | | |
|---|---|---|---|
| 6,699,324 B1 * | 3/2004 | Berdin et al. | 118/306 |
| 7,014,884 B2 * | 3/2006 | Suzuki | 427/233 |
| 8,225,741 B2 * | 7/2012 | Dixon et al. | 118/428 |
| 2003/0172871 A1 * | 9/2003 | Scherer | 118/306 |
| 2006/0225802 A1 | 10/2006 | Kamiyama et al. | |
| 2006/0278290 A1 | 12/2006 | Warren | |

* cited by examiner

APPARATUS AND METHOD FOR INTERNALLY LINING AN ELONGATE MEMBER

This application is the U.S. national phase of International Application. No. PCT/AU2009/000141 filed 5 Feb. 2009 which designated the U.S. and claims priority to Australian Patent Application No. 2008200548 filed 6 Feb. 2008, the entire contents of each of which are incorporated by reference.

FIELD OF THE INVENTION

The present invention relates to processes and apparatus for coating a member with a material and particularly to an apparatus and process for lining tubes and the like.

BACKGROUND ART

Methods and apparatus for lining pipes are currently available.

One proposal to line existing pipelines is disclosed in U.S. Pat. No. 4,687,677 (Jonasson). The proposal involves introduction of a flexible hose-shaped liner containing a curable plastic material into the pipeline to be lined. The flexible liner is introduced into the pipeline in an uncured state and is pressed out against the inside of the pipeline by means of compressed air. The flexible liner is then hardened in place by exposing the curable thermoset resin material to radiation energy. A somewhat similar proposal is disclosed in WO 92/16784 (Lundmark). In this latter proposal, the hose-shaped liner is introduced into the pipeline by either drawing in the liner or by everting the liner into the pipeline.

There have been various proposals for lining conduits involving installation of a liner as a tube which is everted into the passageway being lined, and which comprises an inner layer of resin absorbent material surrounded by a membrane. As the tube is everted, uncured resin is applied to the everting face of the tube to impregnate the layer of resin absorbent material which is then presented to the surface of the passageway. The everted tube is held in place by fluid pressure until the resin cures to form a rigid lining on the passageway surface. One such proposal is described in GB 1512035.

With lining proposals involving eversion of a tube comprising a layer of resin absorbent material, it is most important for there to be effective impregnation of the resin absorbent material. EP 0 082 212 attempts to address this need by provision of a vacuum inside the tube in order to remove air from the resin absorbent material at the everting face so that such material is in an optimum condition to receive the resin presented to it, thereby ensuring effective penetration of the resin into the absorbent material. However, the method outlined of providing the application of vacuum to the tube is a cumbersome procedure, involving positioning of a vacuum pipe within the tube when it is in a collapsed condition prior to eversion.

Additionally, the resin is presented to the everting face of the tube in the form of a large plug of uncured resin in the passageway to which back pressure is applied. This is employed to support the plug of resin and drive the plug, and the seal within the pipe, forward. Consequently, it is necessary for the everting tube to push the plug of uncured resin along the passageway, with the result that the plug of uncured resin can be under high and variable pressure. The fact that the plug of resin is under high variable and uncontrolled pressure can cause difficulties, one being that ongoing delivery of replenishment resin to the plug can be complicated. Further, as there is no monitoring present, there is no knowledge of the size or consistency of the volume of resin. In particular, there is no feed back to determine if the volume trapped between the everting tube and the seal is air or resin. Also, with an uncontrolled resin "plug", the air that becomes trapped in the resin volume cannot escape.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to an apparatus and method for internally lining an elongate member, which may at least partially overcome at least one of the abovementioned disadvantages or provide the consumer with a useful or commercial choice.

With the foregoing in view, the present invention in one form, resides broadly in an apparatus for internally lining an elongate member, the apparatus including an outer barrel portion and an inner mould head, an annular mould cavity defined between the outer barrel portion and the inner mould body, and means for providing a settable material to the mould cavity wherein the settable material is injected into the mould cavity as the elongate member is forced past the cavity, internally lining the elongate member.

In use, the means for injecting the settable material maintains a positive pressure on the material in order to force the material against the internal surface of the elongate member as the elongate member is forced through the mould cavity.

The elongate member can be of any cross-sectional shape. Normally, the elongate member will be a pipe or similar. The apparatus of the invention is normally used for lining lengths of pipe. Of course, differently shaped elongate members or pipes may require a differently shaped mould. Further, the elongate member can be made of any material. It is preferred that the material of the elongate member is at least partially thermally conductive but not thermally degradable.

The settable material used to line the elongate member will normally be polymeric and will normally be a thermoplastic material. Typically, the material will be provided in a raw form such as pellets and will be melted or plasticised prior to use.

The apparatus of the invention will normally be oriented substantially horizontally in use. Although it is recognized that the apparatus may be used vertically, the horizontal orientation will generally be simpler to use.

The apparatus includes an outer barrel portion and an inner mould body. These may be of any shape and but will preferably together define the mould cavity of a preferred cross-sectional shape. Together the outer barrel portion and the inner mould body may be referred to as the mould head section.

The outer barrel portion will normally be a substantially solid member with a bore or opening therethrough. In many of the practical applications, the bore will be circular in shape, given that pipes are generally circular in cross-section.

The inner surface of the bore will preferably be shaped to correspond to the shape of the outer surface of the elongate member. The bore is dimensioned to receive the elongate member with the outer surface of the elongate member abutting the inner surface of the bore of the outer barrel in use. The elongate member is typically slidable within the bore.

The outer barrel normally includes a heated portion in order to maintain the flow characteristics of the settable material within the mould cavity. The heated portion is normally referred to as a heated former.

The apparatus in general, and the outer barrel in particular may further include a cooling former. This is normally located downstream in the processing direction from the heated former. The cooling former will normally be separated, either physically or at least thermally, from the heated former. The cooling former is preferably designed and provided to cool the settable material once applied to the interior surface of the elongate member in order to minimise deformation of the material once applied. Without the cooling former, the heated settable material may have the opportunity to deform before it can cool to an extent that deformation is no longer possible.

The interior walls/surfaces of the heated former and the cooling former preferably flush with one another to define a smooth surface to guide the elongate member without interruption.

The inner mould body is normally mounted coaxially with the outer barrel, preferably concentrically within the outer barrel. The inner mould body is typically shaped to correspond to the shape of the elongate member, particularly the internal shape. It is anticipated that the inner mould body may be shaped differently to the shape of the elongate member if the lining of the elongate member is required to be of a different shape, for example if a circular pipe is required to have a lining defining a rectangular internal cross-section.

The inner mould body preferably includes a mould head, and elongate member or pipe guide is separated from the mould head by an injection body which at least partially defines an injection/distribution cavity.

The elongate member or pipe guide is preferably spaced from the outer barrel by an amount substantially equal to the thickness of the pipe which is being lined. Further, the pipe guide is dimensioned to be closely received within the pipe which is being lined. Therefore, the pipe guide preferably abuts in inside surface of the pipe while the outer barrel abuts the outside of the pipe.

There is preferably a shoulder portion extending (away from the pipe) towards the centre of the pipe guide to define one end of the injection/distribution cavity.

The injection/distribution cavity is typically an annular cavity located between the outer barrel and the inner mould body. The injection distribution cavity preferably includes one or more openings through which the settable material can enter the cavity. These openings are typically through the elongate member or pipe guide. The openings typically extend substantially perpendicularly into the injection/distribution cavity. Typically, more than one opening is provided, spaced radially about the injection/distribution cavity and there is also preferably one or more openings spaced over the length of the cavity.

The injection/distribution cavity is typically located radially within the outer barrel in the area of the heated former.

Preferably, a second shoulder portion extending radially outward is provided and this second shoulder portion preferably defines the second end of the injection cavity. The injection/distribution cavity portion of the inner body and is preferably the smallest of the three portions of the inner mould body.

According to a preferred embodiment, the mould head and the injection/distribution cavity portion may be removable from the elongate member or pipe guide and for example for cleaning or in order to adjust the thickness of the lining by providing an alternative mould head.

The mould head is preferably spaced from the outer barrel in order to control thickness of the lining to be applied to the interior of fee elongate member. The mould head may be separable from or integrally formed with the remainder of the inner mould body. The mould head is preferably dimensioned to be larger than the injection/distribution cavity portion of the inner mould body but smaller than the pipe guide.

The mould head is preferably provided with a mould portion extending substantially parallel (or concentrically parallel) to the outer barrel, defining the mould cavity between the mould portion and the corresponding length of the outer barrel. At least a portion of the length of the mould cavity is located radially within the cooling former. At least a portion of the mould head may extend past or outside the cooling former.

Preferably, the mould head is provided with a tapered, converging terminal end. This tapered end may preferably aid in the positioning of the pipe during insertion and removal of the pipe.

The apparatus also includes a means for providing a settable material to the mould cavity. This means will normally include an injection mechanism, one example of which is an extruder or conveyor, typically with a hopper to feed the extruder or conveyor. Typically, the hopper will hold the raw material which is typically provided in a pellet form. The hopper or the extruder/conveyor may be associated with a heating module in order to melt the material. Alternatively, the extruder/conveyor may plasticize the raw material as the material is forced through the extruder/conveyor.

According to a particularly preferred embodiment of the present invention, a twin screw extruder/conveyor is used. Normally, there will be an outlet from the extruder/conveyor associated with a feed mechanism to provide the extruded settable material to the injection portion of the mould head.

The feed mechanism will normally be provided as an elongate portion. For example, normally the outer barrel and the inner guide portion are elongate, typically approximately as long or longer than the pipe which is to be lined. Normally the mould head will be provided at one end of the elongate structure and the other end of the elongate structure is associated with the extruder/conveyor.

According to a particularly preferred embodiment, the elongate inner guide portion about which the pipe is received, is preferably solid with a longitudinally extending feed line extending over the length of the inner guide portion from the extruder/conveyor to the injection portion. Typically, the feed line is in communication with the outlet openings located in the injection cavity of the mould head.

The outer barrel and the inner guide portion are normally spaced apart over their lengths to form an annular pipe receiving opening into which a pipe is fed, prior to processing. The outer barrel will typically be heated over its length or at least a portion thereof. Normally, a number of heating apparatus will be provided, spaced over the length of the outer barrel to ensure that the flow characteristics of the settable material once extruded, are maintained. Typically, a heating apparatus may be provided every 1-3 m on either lateral side of the outer barrel. Typically, the preferred form of the heating apparatus will be heat probes.

The apparatus will normally also include a means to move the elongate member or pipe relative to the mould cavity rather than moving the mould cavity relative to the pipe. Typically, the means for moving the pipe will allow the elongate member or pipe to be both inserted into the annular pipe receiving opening prior to processing, as well as providing the motive force for drawing of the pipe past the mould head during processing.

The feed direction, namely the direction in which the pipe is fed into the pipe receiving opening, may be the same as the process direction namely the direction in which the pipe is drawn when being lined. However, it is preferable that the feed direction is opposite to the process direction.

According to a preferred embodiment, a means for moving the pipe may be a tractor pull conveyor. There may be a means for moving the pipe provided the lower the pipe to support the pipe once it has exited the apparatus, and a second means for moving the pipe located above the pipe in order to spread the load on the pipe to prevent deformation of the pipe.

In use, the pipe is fed into the annular pipe receiving opening past the mould cavity prior to injection of material into the mould cavity. Once the pipe is positioned in the pipe receiving opening, injection of the settable material is initiated and the pipe is drawn out of the pipe receiving opening, past the mould cavity, internally lining the pipe. The pipe is normally lined substantially over its entire length, but the lining may terminate prior to the ends of the pipe to allow a short distance for the pipes to be joined to one another.

BRIEF DESCRIPTION OF THE DRAWINGS

Various embodiments of the invention will be described with reference to the following drawings, in which.

DETAILED DESCRIPTION OF THE PREFERRED EMBODIMENT

According to a particularly preferred aspect, an apparatus 10 for internally lining a pipe 11 is provided.

Figure 1:
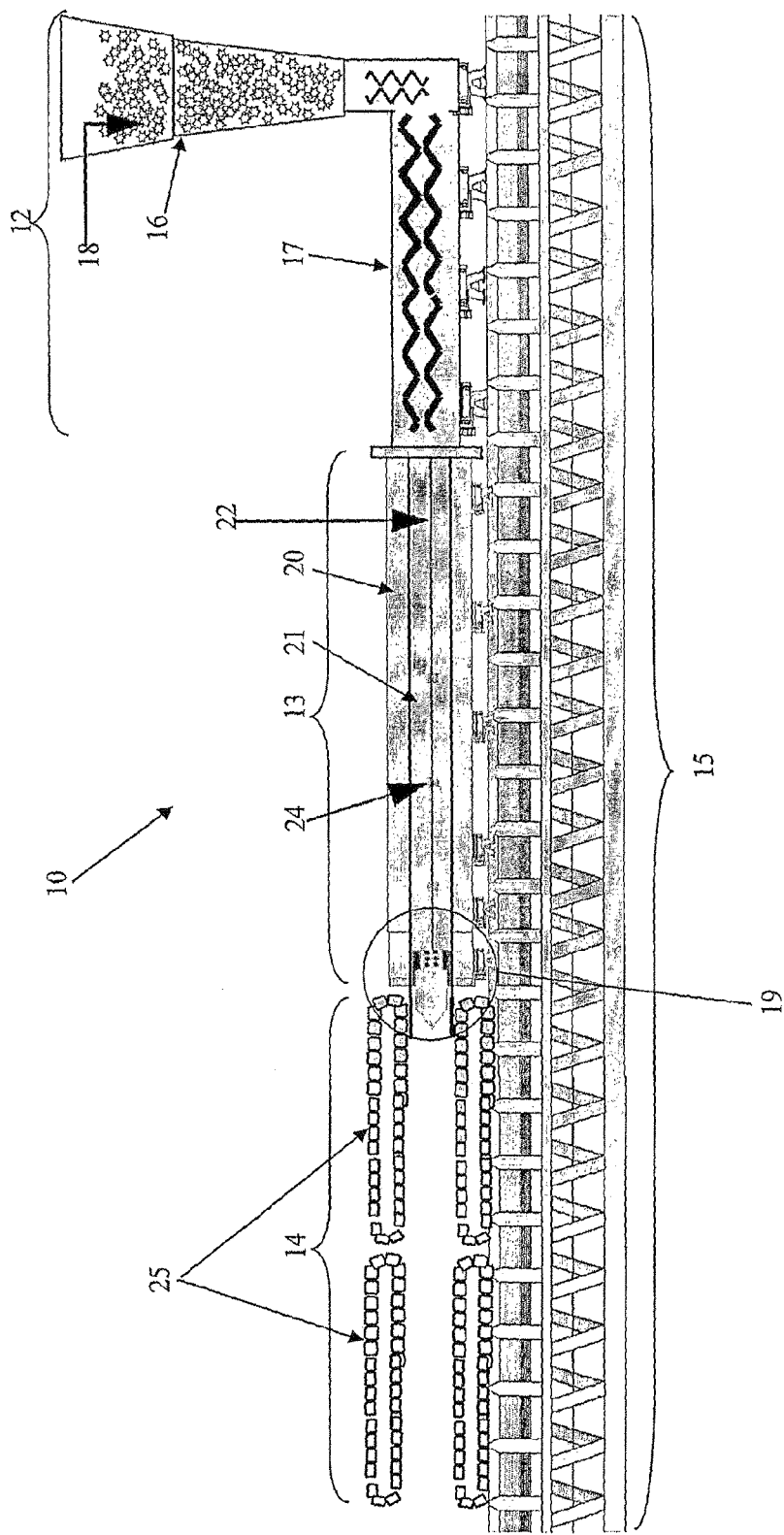
FIG. 1 is a sectional schematic view of an apparatus according to a preferred embodiment of the present invention.
Figure 2:
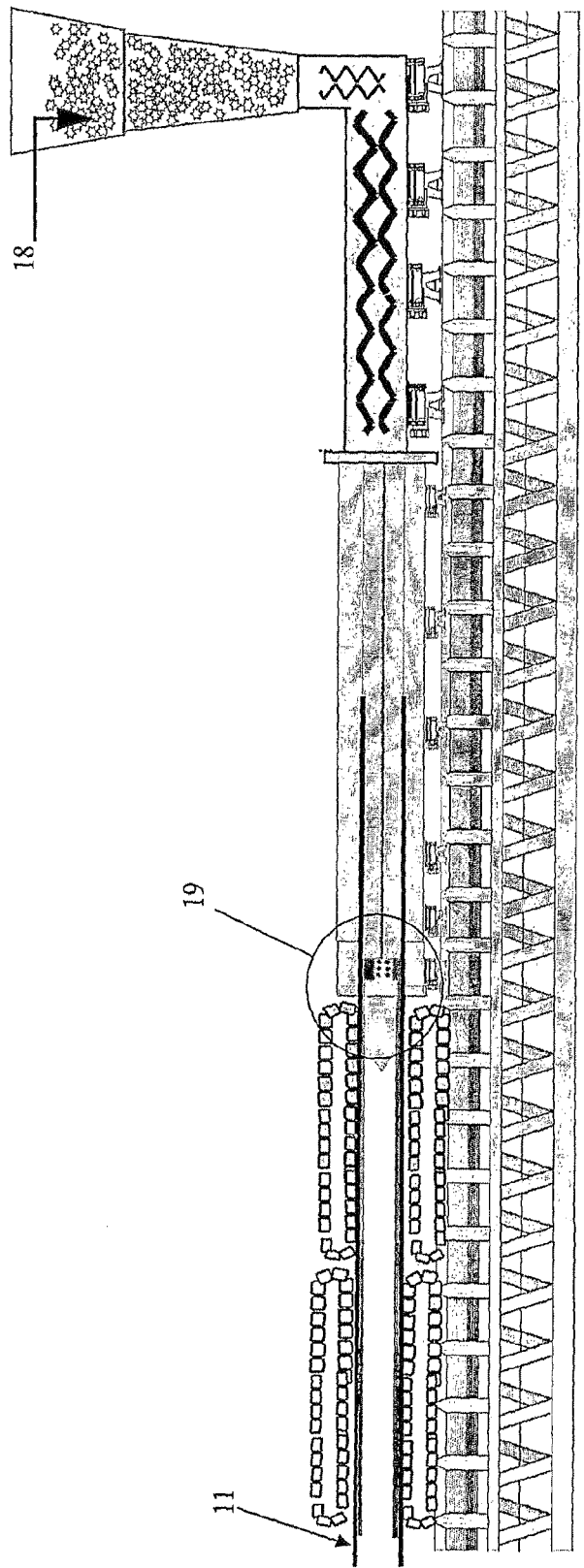
FIG. 2 is a sectional schematic view of an apparatus according to a preferred embodiment of the present invention with a pipe in position.

The apparatus illustrated in FIG. 1 includes three main sections, an extruder or injection mechanism section 12, a processing section 13 and a pipe movement section 14. The sections are illustrated as mounted on a common support 15.

The extruder or injection mechanism 12 includes a hopper 16 to feed an extruder or conveyor 17. The settable material used to line the elongate member is preferably a thermoplastic material and as illustrated, is provided in a raw form such as pellets 18 and plasticised prior to use by the extruder or conveyor 17.

According to the illustrated embodiment of the present invention, a twin screw extruder/conveyor is used. There is an outlet from the extruder/conveyor associated with the processing section 13 by a feed mechanism to provide the extruded settable material a mould head section 19 located in the processing section 13.

The processing section 13 includes an outer barrel 20 and an inner guide portion 21 which are elongate, typically approximately as long or longer than the pipe 11 which is to be lined. According to the illustrated embodiment, the mould head section 19 is provided at one end of the elongate processing section 13 and the other end of the elongate processing section 13 is associated with the extruder/conveyor 12.

According to the illustrated embodiment, the elongate inner guide portion 21 about which the pipe 11 is received, is solid with a longitudinally extending feed line 22 extending over the length of the inner guide portion 21 from the extruder/conveyor 12 to the mould head section 19.

The outer barrel 20 and the inner guide portion 21 are spaced apart over their lengths to form an annular pipe receiving opening 23 into which a pipe 11 is fed, prior to processing. The outer barrel 20 is heated over its length by a number of heat probes 24 spaced over the length of the outer barrel 20 to ensure that the flow characteristics of the settable material once extruded, are maintained.

The apparatus 10 also includes means to move the pipe 11 both into the annular pipe receiving opening 23 prior to processing, as well as providing the motive force for drawing the pipe 11 past the mould head section 19 during processing.

The feed direction, namely the direction in which the pipe 11 is fed into the pipe receiving opening 23 is preferably opposite to the process direction, the direction in which the pipe 11 is drawn when being lined.

According to the illustrated embodiment, the means for moving the pipe is a tractor pull conveyor 25 with one conveyor 25 provided below the pipe 11 to support the pipe 11 once it has exited the processing section 13, and a second conveyor 25 located above the pipe 11 in order to spread the load on the pipe 11 to prevent deformation of the pipe 11.

In use, the pipe 11 is fed into the annular pipe receiving opening 23 past the mould head section 19 prior to injection of material into the mould head section 19. Once the pipe 11 is positioned in the pipe receiving opening 23, injection of the settable material is initiated and the pipe 11 is drawn out of the pipe receiving opening 23, past the mould head section 19, internally lining the pipe 11.

Figure 3:
FIG. 3 is a cross-sectional schematic view of a pipe with internal layer.

As illustrated in FIG. 3, the pipe 11 is normally lined substantially over its entire length, with the lining 26 terminating prior to the ends of the pipe 11 to allow a short distance for adjacent pipes 11 to be joined to one another.

Figure 4:
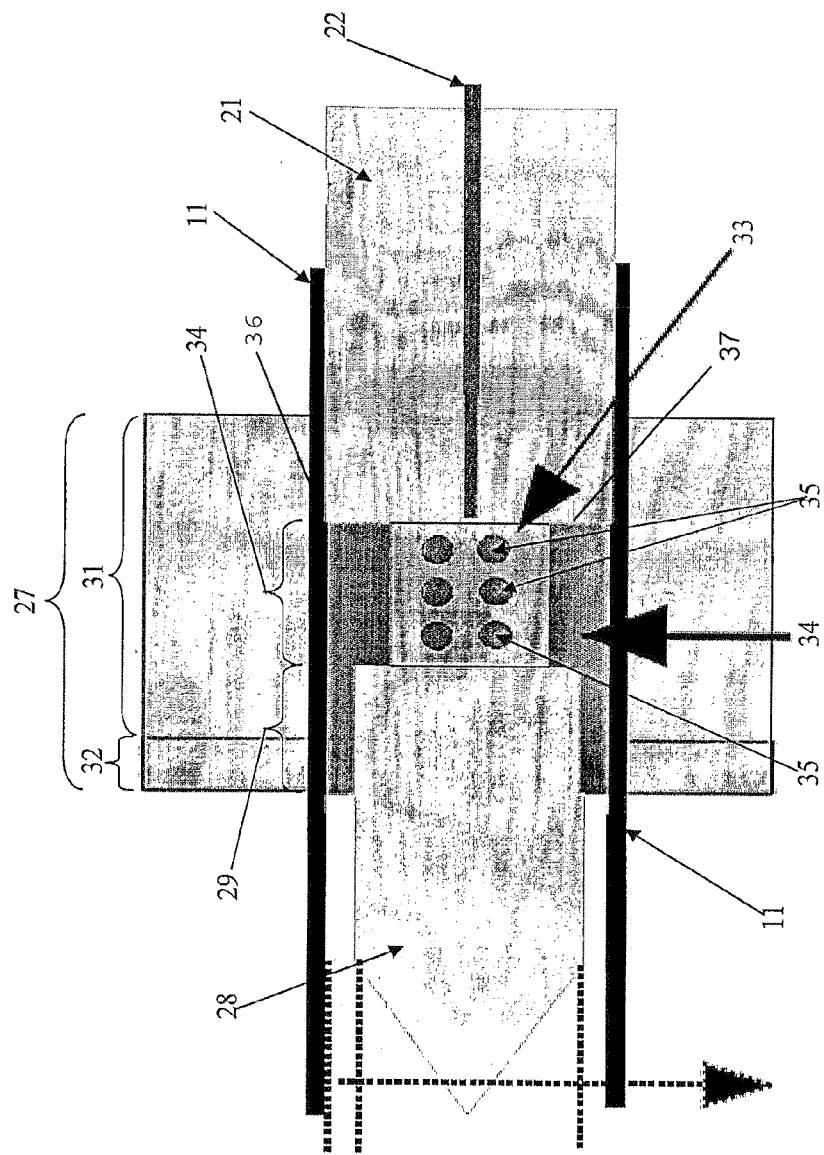
FIG. 4 is a sectional schematic view of a portion of the apparatus illustrated in FIGS. 1 and 2 as identified by reference letter A in FIG. 1.
Figure 5:
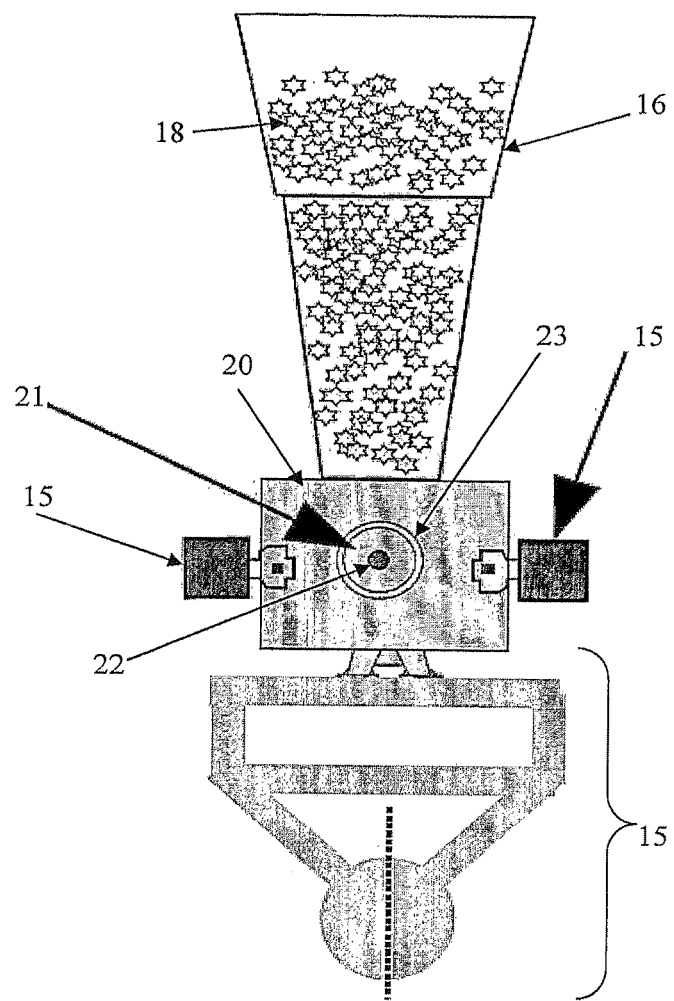
FIG. 5 is a sectional schematic view from the end of the apparatus illustrated in FIGS. 1 and 2.
Figure 6:
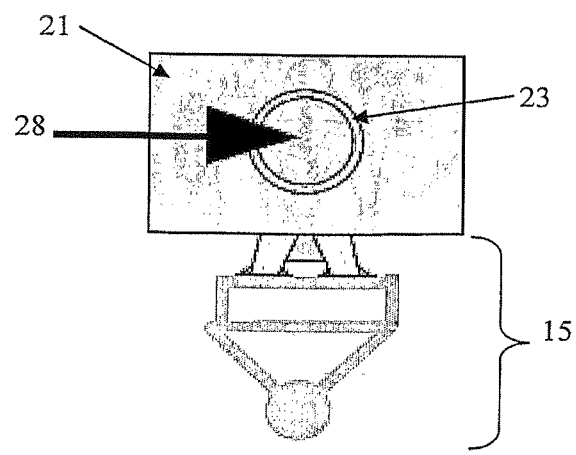
FIG. 6 a schematic view from the end of the apparatus illustrated in FIGS. 1 and 2.

The mould head section of a preferred embodiment is illustrated in FIG. 4. The mould head section 19 includes an outer barrel portion 27 and an inner mould head 28, an annular mould cavity 29 defined between the outer barrel portion 27 and the inner mould head 28, and an injection cavity 30 for providing the settable material to the mould cavity 29 as the pipe 11 is forced past the injection cavity 30, internally lining the pipe 11.

The outer barrel portion 27 is a substantially solid member with a bore therethrough. The inner surface of the bore is shaped to correspond to the shape of the outer surface of the pipe 11. The bore is dimensioned to receive the pipe 11 with the outer surface of the pipe 11 abutting the inner surface of the bore of the outer barrel 27 in use. The pipe is slidable within the bore.

The outer barrel 27 normally includes a heated former 31 in order to maintain the flow characteristics of the settable material within the mould cavity.

As illustrated, the outer barrel 27 further includes a cooling former 32 located downstream in the processing direction from the heated former 31.

The interior walls/surfaces of the heated former 31 and the cooling former 32 are flush with one another to define a smooth surface to guide the pipe 11 without interruption.

The inner mould body is mounted coaxially with the outer barrel 27. The illustrated inner mould body includes a mould head 28, a pipe guide 21 separated from the mould head 28 by an injection body 33 which at least partially defines an injection/distribution cavity 34.

The pipe guide 21 is spaced from the outer barrel 27 by an amount substantially equal to the thickness of the pipe 11 which is being lined. Further, the pipe guide 21 is dimensioned to be closely received within the pipe 11 which is being lined. Therefore, the pipe guide 21 abuts in inside surface of the pipe 11 while the outer barrel 27 abuts the outside of the pipe 11.

There is a shoulder portion 36 extending (away from the pipe 11) towards the centre of the pipe guide 21 to define one end of the injection/distribution cavity 34.

As illustrated in FIG. 4, the injection/distribution cavity 34 is an annular cavity located between the outer barrel 27 and the injection body 33. The injection distribution cavity 34 includes openings 35 through which the settable material can enter the cavity 34. The openings 35 extend substantially perpendicularly into the injection/distribution cavity 34. More than one opening 35 is provided, spaced radially about the injection/distribution cavity 34 and over the length of the cavity 34.

The feed line 22 communicates with the outlet openings 35 located in the injection cavity 34. The injection/distribution cavity 34 is located radially within the outer barrel 27 in the area of the heated former 31.

A second shoulder portion 37 extending radially outward is provided and this second shoulder portion defines the second end of the injection cavity 34.

The mould head 28 is spaced from the outer barrel 27 in order to control thickness of the lining 26 to be applied to the interior of the pipe 11.

The mould head 28 is provided with a wall extending substantially parallel (or concentrically parallel) to the outer barrel 27, defining the mould cavity between wall and the corresponding length of the outer barrel 27. At least a portion of the length of the mould cavity 29 is located radially within the cooling former 32. At least a portion of the mould head 28 extends past or outside the cooling former 32.

Preferably, the mould head 28 is provided with a tapered, converging terminal end to aid in the positioning of the pipe 11 during insertion and removal of the pipe 11.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus for internally lining a pipe, the apparatus comprising:
    a mould head section including an outer barrel portion and an inner mould head,
    an annular mould cavity defined between the outer barrel portion and the inner mould head, the mould head section located adjacent an outer terminal end of a pipe receiving opening,
    an injection body within the outer barrel portion and adjacent the inner mould head, wherein the injection body at least partially defines an injection/distribution cavity open to the annular mould cavity;
    the pipe receiving opening defined between the outer barrel portion and a pipe guide, wherein the pipe guide is concentric to the outer barrel portion and the pipe guide is separated, along an axis of the outer barrel potion, from the inner mould head by the injection body, and
    the injection body configured to provide a settable material to the annular mould cavity, wherein the settable material is injected from the injection body into the injection/distribution cavity and flows to the mould cavity as the pipe is forced past the mould cavity through the pipe receiving opening and the injected settable material internally lines the pipe.

2. An apparatus according to claim 1 wherein the outer barrel portion of the mould head section includes a heated former portion adapted to maintain flow characteristics of the settable material within the mould cavity.

3. An apparatus according to claim 2 wherein the outer barrel portion includes a cooling former portion located downstream in a processing direction from the heated former portion.

4. An apparatus according to claim 1 wherein the pipe guide is spaced from the outer barrel portion by a distance at least equal to a thickness of the pipe being lined.

5. An apparatus according to claim 1 wherein the injection/distribution cavity is an annular cavity defined between the injection body and the outer barrel portion, and wherein the injection body is separated from the inner mould head and the pipe guide by spaced apart shoulder portions extending away from the outer barrel portion.

6. An apparatus according to claim 1 wherein the injection body includes one or more openings communicable with the injection/distribution cavity, through which the settable material can enter the injection/distribution cavity.

7. An apparatus according to claim 6 wherein more than one opening is provided spaced radially about the injection body and one or more openings spaced over the length of the injection body.

8. An apparatus according to claim 1 wherein the injection/distribution cavity is located radially within the outer barrel portion in the area of the heated former portion.

9. An apparatus according to claim 1 wherein the inner mould head is provided with a wall extending concentrically parallel to the outer barrel portion, defining the mould cavity between the wall and the corresponding length of the outer barrel portion.

10. An apparatus according to claim 3 wherein at least a portion of the length of the mould cavity is located radially within the cooling former portion.

11. An apparatus according to claim 9 wherein the inner mould head is provided with a tapered, converging terminal end.

12. An apparatus according to claim 1 further comprising an extruder/conveyor to plasticize the settable material as the material is forced through the extruder/conveyor.

13. An apparatus according to claim 1 wherein the further comprising a longitudinally extending feed line extending over the length of the pipe guide and communicable with the mould cavity.

14. An apparatus according to claim 1 wherein the outer barrel portion is heated over at least a portion of its length.

15. An apparatus according to claim 1 further including a conveyor to move the pipe relative to the mould cavity.

16. An apparatus according to claim 1 wherein the direction in which the pipe is fed into the pipe receiving opening is opposite to the direction in which the pipe is drawn when being lined.

17. An apparatus according to claim 1 wherein the inner mould head is shaped differently from the shape of the pipe.

18. An apparatus according to claim 1 wherein the settable material used to line the pipe is a thermoplastic or thermosetting polymeric material.

\* \* \* \* \*